(12) United States Patent
Li et al.

(10) Patent No.: US 11,384,283 B2
(45) Date of Patent: Jul. 12, 2022

(54) SURFACE POLYMERIZED PROPPANTS

(71) Applicants: Saudi Arabian Oil Company, Dhahran (SA); Alfaisal University, Riyadh (SA)

(72) Inventors: Wengang Li, Khobar (SA); Edreese Alsharaeh, Riyadh (SA); Ayman Almohsin, Doha (SA); Mohammed Abdullah Bataweel, Dhahran (SA)

(73) Assignees: Saudi Arabian Oil Company, Dhahran (SA); Alfaisal University, Riyadh (SA)

( * ) Notice: Subject to any disclaimer, the term of this patent is extended or adjusted under 35 U.S.C. 154(b) by 183 days.

(21) Appl. No.: 16/553,328

(22) Filed: Aug. 28, 2019

(65) Prior Publication Data

US 2021/0062076 A1 Mar. 4, 2021

(51) Int. Cl.
*C09K 8/80* (2006.01)
*C09K 8/70* (2006.01)

(52) U.S. Cl.
CPC ............. *C09K 8/805* (2013.01); *C09K 8/70* (2013.01)

(58) Field of Classification Search
None
See application file for complete search history.

(56) References Cited

U.S. PATENT DOCUMENTS

| | | | |
|---|---|---|---|
| 5,597,784 A | 1/1997 | Sinclair et al. | |
| 6,528,157 B1 | 3/2003 | Hussain et al. | |
| 7,153,575 B2 | 12/2006 | Anderson et al. | |
| 7,867,613 B2 | 1/2011 | Smith et al. | |
| 8,298,667 B2 | 10/2012 | Smith et al. | |
| 8,557,916 B1 | 10/2013 | Alsharaeh et al. | |
| 9,403,115 B2 * | 8/2016 | Majumder | ............. C02F 1/288 |

(Continued)

FOREIGN PATENT DOCUMENTS

| WO | 2011050046 A1 | 4/2011 |
|---|---|---|
| WO | 2011146186 A2 | 11/2011 |

(Continued)

OTHER PUBLICATIONS

De Campos et al., "Hydraulic fracturing proppants", Ceramica, Voll 64, pp. 219-229, 2018.

(Continued)

*Primary Examiner* — John J Figueroa
(74) *Attorney, Agent, or Firm* — Dinsmore & Shohl LLP

(57) ABSTRACT

Coated particles include a particulate substrate, a surface copolymer layer surrounding the particulate substrate, and a resin layer surrounding the surface copolymer layer. The surface copolymer layer includes a copolymer of at least two monomers chosen from styrene, methyl methacrylate, ethylene, propylene, butylene, imides, urethanes, sulfones, carbonates, and acrylamides. The resin layer includes a cured resin. Methods of preparing the coated particles include preparing a first mixture including at least one polymerizable material, an initiator, and optionally a solvent; contacting the first mixture to a particulate substrate to form a polymerization mixture; heating the polymerization mixture to cure the polymerizable material and form a polymer-coated particulate; preparing a second mixture including the polymer-coated substrate, an uncured resin, and a solvent; and adding a curing agent to the second mixture to cure the uncured resin and form the coated particle.

24 Claims, 12 Drawing Sheets

(56) References Cited

U.S. PATENT DOCUMENTS

| | | | |
|---|---|---|---|
| 9,938,454 B2 | 4/2018 | Tanguay et al. | |
| 10,011,674 B2 | 7/2018 | Viswanath et al. | |
| 10,017,689 B2 | 7/2018 | Nguyen et al. | |
| 10,036,239 B2 | 7/2018 | Salla et al. | |
| 2008/0135245 A1* | 6/2008 | Smith | C04B 35/62886 166/280.2 |
| 2011/0278003 A1* | 11/2011 | Rediger | C09K 8/805 166/280.1 |
| 2012/0205101 A1 | 8/2012 | Pribytkov et al. | |
| 2015/0119301 A1* | 4/2015 | McDaniel | C09K 8/805 507/224 |
| 2016/0024376 A1 | 1/2016 | Fitzgerald et al. | |
| 2016/0032179 A1 | 2/2016 | Tanguay et al. | |
| 2016/0230083 A1 | 8/2016 | Mohanty et al. | |
| 2017/0247608 A1 | 8/2017 | Raysoni et al. | |
| 2017/0327729 A1 | 11/2017 | Salla et al. | |
| 2018/0134949 A1* | 5/2018 | Monastiriotis | C09K 8/805 |
| 2019/0002756 A1 | 1/2019 | Kincaid et al. | |

FOREIGN PATENT DOCUMENTS

| | | |
|---|---|---|
| WO | 2013033391 A1 | 3/2013 |
| WO | 2013192634 A2 | 12/2013 |
| WO | 2018031915 A1 | 2/2018 |

OTHER PUBLICATIONS

International Search Report and Written Opinion dated Apr. 28, 2020 pertaining to International application No. PCT/US2019/057168 filed Oct. 21, 2019, 11 pgs.
GCC First Office Action dated Jan. 31, 2021 which pertains to GCC Patent Application No. 2019-38861, filed Dec. 18, 2019, 3 pages.
International Search Report and Written Opinion dated Sep. 8, 2021 pertaining to International application No. PCT/US2021/033636 filed May 21, 2021, 15 pages.
International Search Report and Written Opinion dated Oct. 5, 2021 pertaining to International application No. PCT/US2021/037819 filed Jun. 17, 2021, 15 pages.
Alsharaeh et al., "Evaluation of Nanomechanical Properties of (Styrene-Methyl Methacrylate) Copolymer Composites Containing Graphene Sheets", Industrial & Engineering Chemistry Research, vol. 52, pp. 17871-17881, 2013.
Fereidoon et al., "Nanomechanical and Nanoscratch Performance of Polystyrene/Poly(methyl methacrylate)/Multi-Walled Carbon Nanotubes Nanocomposite Coating", Polymer Composites, 7 pgs., 2017.
Gidley et al., "Effect of Proppant Failure and Fines Migration on Conductivity of Propped Fractures", SPE Production & Facilities, pp. 20-25, Feb. 1995.
Nguyen et al., "A New Approach for Enhancing Fracture Conductivity", Society of Petroleum Engineers, SPE 50002, 14 pgs., 1998.
Wang et al., "Reinforced performances of polymethyl methacrylate/silica fume composite spherical particles used as ultra-lightweight proppants", Journal of Reinforced Plastics & Composites, vol. 34(B), pp. 672-683, 2015.
zhan et al., "Synthesis of Low-Density Heat-Resisting Polystyrene/Graphite Composite Microspheres Used as Water Carrying Fracturing Proppants", Polymer-Plastics Technology and Engineering, vol. 53, pp. 1647-1653, 2014.
Rickards et al., "High Strength, Ultralightweight Proppant Lends New Dimensions to Hydraulic Fracturing Applications", Society of Petroleum Engineers, SPE 84308, pp. 212-221, May 2006.
Zhang et al., "Ultra-lightweight composite proppants prepared via suspension polymerization", Journal of Composite Materials, vol. 0(0), pp. 1-9, 2015.
Liang et al., "A comprehensive review on proppant technologies", Petroleum, pp. 1-14, 2015.
Zoveidavianpoor et al., "Application of polymers for coating of proppant in hydraulic fracturing of subterraneous formations: A comprehensive review", Journal of Natural Gas Science and Engineering 24, pp. 197-209, 2015.
Hu et al., "Proppants Selection Based on Field Case Studies of Well Production Performance in the Bakken Shale Play", Society of Petroleum Engineers, SPE-169556-MS, 20 pgs., 2014.
Xu et al., "Study on Preparation and Properties of PMMA composite microspheres as the matrix of low density proppant", Applied Mechanics and Materials vols. 457-458, pp. 116-119, 2014.
Gianotti et al., "On the Thermal Stability of PS-b-PMMA Block and P(S-r-MMA) Random Copolymers for Nanopattering Applications", Macromolecules, vol. 46, pp. 8224-8234, 2013.
Chuai et al., "Thermal Behavior and Properties of Polystyrene/Poly(methyl methacrylate) Blends", Journal of Applied Polymer Science, vol. 91, pp. 609-620, 2004.
Pangilinan et al., "Polymers for proppants used in hydraulic fracturing", Journal of Petroleum Science and Engineering, Manuscript 23 pgs., Mar. 30, 2016.

* cited by examiner

SURFACE POLYMERIZED PROPPANTS

TECHNICAL FIELD

Embodiments of the present disclosure generally relate to proppants for hydraulic fracturing processes.

BACKGROUND

Proppants such as fracking sands are widely incorporated into hydraulic fracturing processes. The ability of a proppant to hold subterranean fractures open in general is limited by the mechanical strength of the proppant. Fracking sands, for example, have limited use as proppant materials in high-pressure processes that are conducted at greater than 4000 pounds-per-square-inch (psi), owing to brittleness of individual grains and their tendency to be crushed under the high pressures. Accordingly, ongoing needs exist for increasing the crush strength of proppant materials including, but not limited to, fracking sands.

SUMMARY

Against the previously described background, example embodiments disclosed herein are directed to coated particles including a particulate substrate, a surface copolymer layer surrounding the particulate substrate, and a resin layer surrounding the surface copolymer layer. The surface copolymer layer includes a copolymer of at least two monomers chosen from styrene, methyl methacrylate, ethylene, propylene, butylene, imides, urethanes, sulfones, carbonates, and acrylamides. The resin layer includes a cured resin.

Further example embodiments are directed to methods of preparing coated particles. The methods include preparing a first mixture including at least one polymerizable material, an initiator, and optionally a solvent. The methods further include contacting the first mixture to a particulate substrate to form a polymerization mixture. The methods further include heating the polymerization mixture to cure the polymerizable material and form a polymer-coated particulate including the particulate substrate and a surface copolymer layer surrounding the particulate substrate. The methods further include preparing a second mixture comprising the polymer-coated substrate, an uncured resin, and a solvent. The methods further include adding a curing agent to the second mixture to cure the uncured resin and form the coated particle. The coated particle includes the particulate substrate, the surface copolymer layer surrounding the particulate substrate, and a resin layer surrounding the surface copolymer layer. The resin layer includes a cured resin.

Further example embodiments are directed to hydraulic fracturing compositions including a fluid medium and coated particles according to embodiments of this disclosure dispersed within the fluid medium.

Further example embodiments are directed to methods of treating a subterranean formation. The methods include contacting a subterranean formation with a hydraulic fracturing composition according to embodiments of this disclosure. The methods further include propagating at least one subterranean fracture in the subterranean formation with the hydraulic fracturing fluid.

Additional features and advantages of the embodiments described in this disclosure will be set forth in the detailed description which follows, and in part will be readily apparent to those skilled in the art from that description or recognized by practicing the embodiments described in this disclosure, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described in this disclosure and, together with the description, serve to explain the principles and operations of the claimed subject matter.

DETAILED DESCRIPTION

Reference will now be made in detail to embodiments of coated particles. The coated particles include a surface copolymer layer surrounding a particulate substrate and a resin layer surrounding the surface copolymer layer. The surface copolymer layer, the resin layer, or both the surface copolymer layer and the resin layer may include a nanoparticulate additive. The layers surrounding the coated particles may increase the crush strength of the particulate substrate by imparting additional mechanical stability generally from the added layers, or by increasing the roundness and the sphericity of individual particles. The coated particles according to embodiments may exhibit mechanical properties, including but not limited to crush strengths, rendering the coated particles suitable for use as proppants in fracking operations that require particle stability at temperatures and pressures commonly encountered within fracking fissures.

Figure 1:
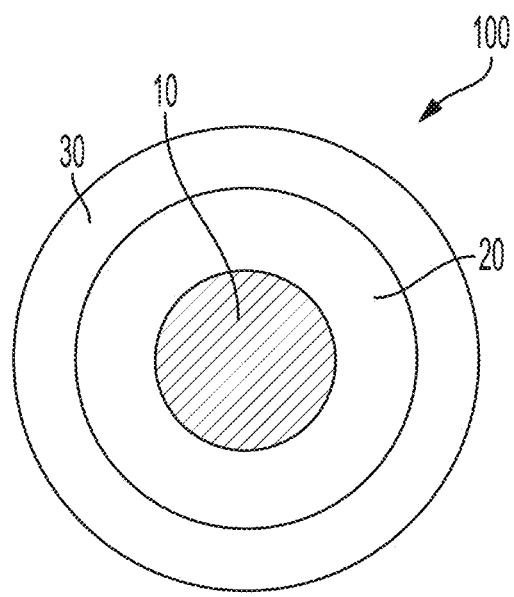
FIG. 1 is a schematic diagram of a coated particle according to embodiments, in which a particulate substrate is surrounded by a surface copolymer layer and in which the surface copolymer layer is surrounded by a resin layer.

Referring to FIG. 1, a coated particle 100 according to embodiments includes a particulate substrate 10. The particulate substrate 10 is surrounded by a surface copolymer layer 20. The surface copolymer layer includes a copolymer of at least two monomers chosen from styrene, methyl methacrylate, ethylene, propylene, butylene, imides, urethanes, sulfones, carbonates, and acrylamides. The surface copolymer layer 20 is surrounded by a resin layer 30. The resin layer 30 includes a cured resin. The particulate substrate 10, the surface copolymer layer 20, and the resin layer 30 each will be described now in greater detail.

The particulate substrate 10 may be chosen from any type of particle material suitable for use in hydraulic fracturing (fracking) applications. In hydraulic fracturing, proppants are propping agent particles added to hydraulic fracturing fluids to maintain and hold open subterranean fractures during or following subterranean treatment. In some embodiments, the particulate substrate 10 may include particles of materials such as oxides, silicates, sand, ceramic, resin, plastic, mineral, glass, or combinations of these. For example, the particulate substrate 10 may be a sand such as a graded sand, a treated sand, a ceramic proppant, or a plastic proppant. Treated sands may include sands having surfaces modified by a polymerization initiator. The particulate substrate 10 may include particles of bauxite or of sintered bauxite. The particulate substrate 10 may include glass particles or glass beads. The particulate substrate 10 may include particles generally resistant to deformation under pressure or at elevated temperature. The particulate substrate 10 may include particulate materials that do not melt at a temperature less than 300 degrees Celsius (300° C.), less than 250° C., less than 200° C., less than 150° C., or less than 100° C., for example.

Figure 3:
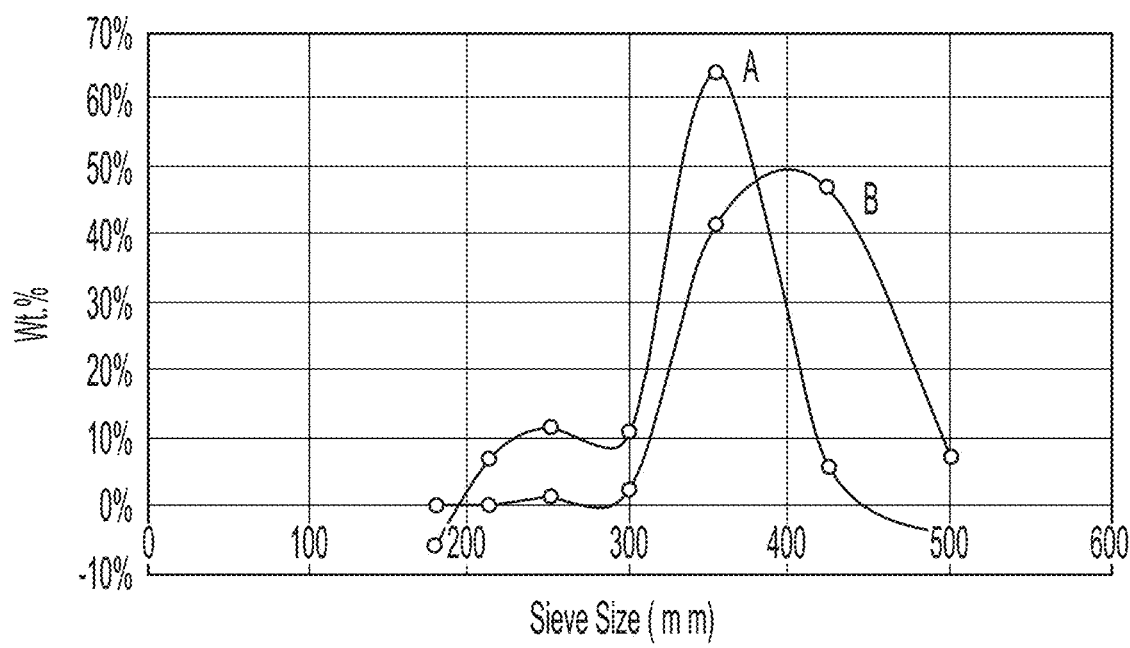
FIG. 3 is a graph of particle size distributions of (A) a neat particulate substrate and (B) coated particles according to embodiments, in which a particulate substrate is surrounded by a surface copolymer layer and in which the surface copolymer layer is surrounded by a resin layer.

The particulate substrate 10 may have any size, size distribution, and shape common to proppant particles for hydraulic fracturing. In some embodiments, the particulate substrate 10 may include particles having sizes from 8 mesh to 140 mesh (diameters from 106 micrometers (μm) to 2.36 millimeters (mm)). In some embodiments, the particulate substrate 10 may include particles having sizes from 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). FIG. 3 is a graph of exemplary particle size distributions of (A) an untreated sand suitable as a particulate substrate; and (B) coated particles according to embodiments, in which the sand particulate substrate is surrounded by a surface copolymer layer of polystyrene-co-poly(methyl methacrylate) and in which the surface copolymer layer is surrounded by a resin layer of a cured epoxy resin.

The sphericity and roundness of individual particles of the particulate substrate 10 may vary. As will be described subsequently, however, in the coated particles 100 according to embodiments, the additions of the surface copolymer layer 20 and the resin layer 30 to the particulate substrate 10 may increase roundness, sphericity, or both roundness and sphericity of the particulate substrate 10 and, in turn, impart mechanical stability and greater crush strength to the particulate substrate 10.

The coated particles 100 according to embodiments further include a surface copolymer layer 20 surrounding or coating the particulate substrate 10. The surface copolymer layer 20 is or includes a copolymer of at least two monomers chosen from styrene, methyl methacrylate, ethylene, propylene, butylene, imides, urethanes, sulfones, carbonates, and acrylamides.

In embodiments, the surface copolymer layer 20 may be or may include a copolymer of primary comonomers and secondary comonomers. In such embodiments, the primary comonomers are monomer units of a single chemical structure that compose the greatest portion by weight of the entire copolymer, compared to any other monomer units in the copolymer. Also in such embodiments, the secondary comonomers may all have identical structures or may be a combination of from 2 to 10, from 2 to 8, from 2 to 5, or from 2 to 3, different structures. When the secondary comonomers all have identical chemical structures, the copolymer is composed of from 50 weight percent (wt. %) to 95 wt. %, or greater than or equal to 50 wt. %, greater than or equal to 60 wt. %, greater than or equal to 70 wt. %, greater than or equal to 80 wt. %, or greater than or equal to 90 wt. % primary comonomer, based on the total weight of the copolymer, the remainder of the copolymer being composed of the single type of secondary comonomer. When the secondary comonomers are a combination of greater than one type of comonomer, the copolymer may be composed of from 20 wt. % to 95 wt. % primary monomer and from 5 wt. % to 80 wt. % total secondary monomers, based on the total weight of the copolymer. The copolymer may be a random copolymer, a block copolymer, or a graft copolymer.

In embodiments, the surface copolymer layer may comprise a polystyrene, such as a styrene copolymer having styrene units as primary comonomers and at least one secondary comonomer chosen from methyl methacrylate, ethylene, propylene, butylene, imides, urethanes, sulfones, carbonates, and acrylamides. In embodiments, the surface copolymer layer may comprise a poly(methyl methacrylate), such as a methyl methacrylate copolymer having methyl methacrylate units as primary comonomers and at least one secondary comonomer chosen from styrene, ethylene, propylene, butylene, imides, urethanes, sulfones, carbonates, and acrylamides. In embodiments, the surface copolymer layer may comprise a polyethylene, such as an ethylene copolymer having ethylene units as primary comonomers and at least one secondary comonomer chosen from styrene, methyl methacrylate, propylene, butylene, imides, urethanes, sulfones, carbonates, and acrylamides. In embodiments, the surface copolymer layer may comprise a polypropylene, such as a propylene copolymer having propylene units as primary comonomers and at least one secondary comonomer chosen from styrene, methyl methacrylate, ethylene, butylene, imides, urethanes, sulfones, carbonates, and acrylamides. In embodiments, the surface copolymer layer may comprise a polybutylene, such as a butylene copolymer having butylene units as primary comonomers and at least one secondary comonomer chosen from styrene, methyl methacrylate, ethylene, propylene, imides, urethanes, sulfones, carbonates, and acrylamides. In embodiments, the surface copolymer layer may comprise a polyimide, such as an imide copolymer having imide units as primary comonomers and at least one secondary comonomer chosen from styrene, methyl methacrylate, ethylene, propylene, butylene, urethanes, sulfones, carbonates, and acrylamides. In embodiments, the surface copolymer layer may comprise a polyurethane, such as a urethane copolymer having urethane units as primary comonomers and at least one secondary comonomer chosen from styrene, methyl methacrylate, ethylene, propylene, butylene, imides, sulfones, carbonates, and acrylamides. In embodiments, the surface copolymer layer may comprise a polysulfone, such as a sulfone copolymer having sulfone units as primary comonomers and at least one secondary comonomer chosen from styrene, methyl methacrylate, ethylene, propylene, butylene, imides, urethanes, carbonates, and acrylamides. In embodiments, the surface copolymer layer may comprise a polycarbonate, such as a carbonate copolymer having carbonate units as primary comonomers and at least one secondary comonomer chosen from styrene, methyl methacrylate, ethylene, propylene, butylene, imides, sulfones, urethanes, and acrylamides. In embodiments, the surface copolymer layer may comprise a polyacrylamide, such as an acrylamide copolymer having acrylamide units as primary comonomers and at least one secondary comonomer chosen from styrene, methyl methacrylate, ethylene, propylene, butylene, imides, sulfones, urethanes, and carbonates.

In embodiments, the surface copolymer layer may comprise a copolymer of styrene and methyl methacrylate (a poly(stryrene-co-methyl methacrylate), referred to subsequently as PS-PMMA). The PS-PMMA may be composed of from 1 wt. % to 95 wt. % styrene monomer units and from 95 wt. % to 1 wt. % methyl methacrylate monomer units, where the sum of the weight of the styrene monomer units and the weight of the methyl methacrylate monomer units equals the total weight of the copolymer. In embodiments, the surface copolymer layer may comprise a PS-PMMA having an exemplary weight ratio of polystyrene units to poly(methyl methacrylate) units of 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, or 99:1, or any ratio between any of two of these exemplary ratios, or any range of ratios from one of these exemplary ratios to another of these exemplary ratios.

In embodiments, the coated particle 100 includes the resin layer 30 that surrounds the surface copolymer layer 20. The resin layer 30 includes a cured resin. The cured resin of the resin layer 30 may be any resin capable of being coated on a substrate in an uncured form and of curing on the substrate with or without catalysts, hardeners, crosslinking agents, or coupling agents, and with or without the application of heat, UV radiation, or other common curing processes. Examples of cured resins for the resin layer 30 include epoxy resins such as bisphenol A epoxy resins, bisphenol F epoxy resins, Novolac epoxy resins, aliphatic epoxy resins, glycidylamine epoxy resins, and polyepoxide resins. Other suitable cured resins include, for example, phenol-aldehyde resins, urea-aldehyde resins, urethane resins, phenolic resins, furan resins, furan-furfuryl-alcohol resins, phenolic-latex resins, phenol formaldehyde resins, silicon-based resins, polyester resins, acrylate resins, and hybrids or copolymers of any of these.

Figure 2A:
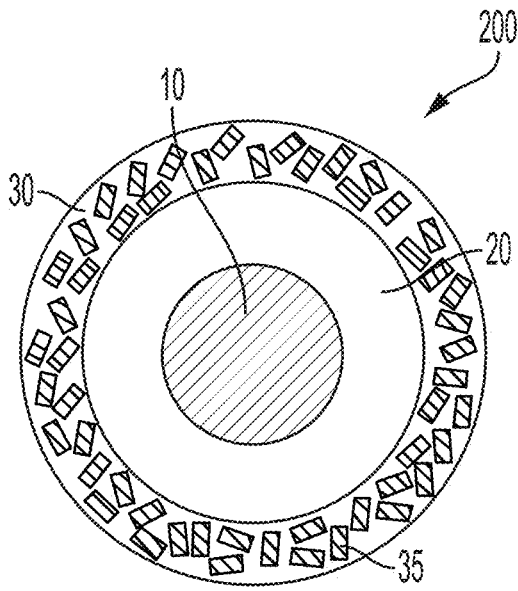
FIG. 2A is a schematic diagram of a coated particle according to embodiments, in which a particulate substrate is surrounded by a surface copolymer layer and in which the surface copolymer layer is surrounded by a resin layer containing a nanoparticulate additive or filler.
Figure 2B:
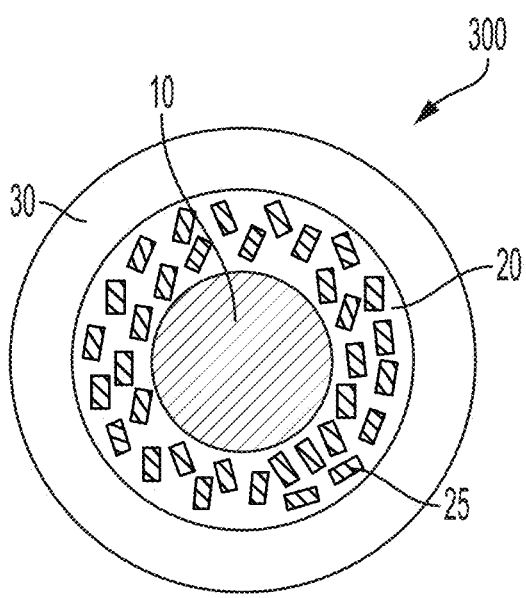
FIG. 2B is a schematic diagram of a coated particle according to embodiments, in which a particulate substrate is surrounded by a surface copolymer layer containing a nanoparticulate additive or filler, and in which the surface copolymer layer is surrounded by a resin layer.
Figure 2C:
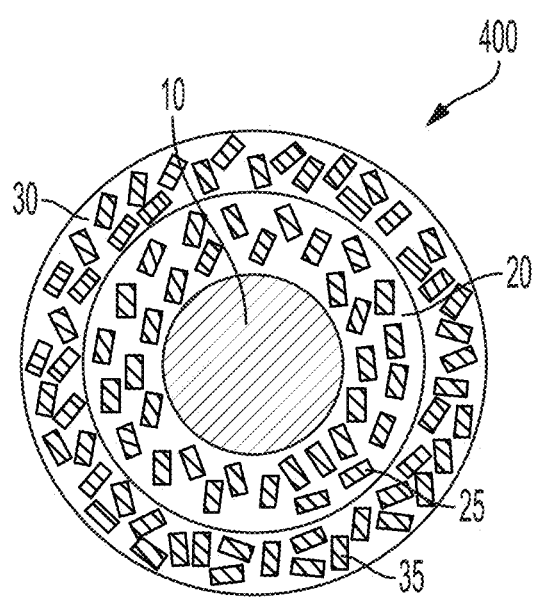
FIG. 2C is a schematic diagram of a coated particle according to embodiments, in which a particulate substrate is surrounded by a surface copolymer layer containing a nanoparticulate additive or filler, and in which the surface copolymer layer is surrounded by a resin layer containing a nanoparticulate additive or filler.

Referring now to FIGS. 2A-2C, the coated particles 100 according to embodiments may further include at least one nanoparticulate additive 25, 35. The nanoparticulate additive 25, 35 may be added to the surface copolymer layer 20, to the resin layer 30, or to both the surface copolymer layer 20 and the resin layer 30. In the modified-resin coated particle 200 of FIG. 2A, for example, the particulate substrate 10 is surrounded by a surface copolymer layer 20 without a nanoparticulate additive, and the surface copolymer layer 20 is surrounded by a resin layer 30 that includes a nanoparticulate additive 35. In the modified-copolymer coated particle 300 of FIG. 2B, for example, the particulate substrate 10 is surrounded by a surface copolymer layer 20 including a nanoparticulate additive 25, and the surface copolymer layer 20 including the nanoparticulate additive 25 is surrounded by a resin layer 30 without a nanoparticulate additive. In the doubly-modified coated particle 400 of FIG. 2C, for example, the particulate substrate 10 is surrounded by a surface copolymer layer 20 including a nanoparticulate additive 25, and the surface copolymer layer 20 including the nanoparticulate additive 25 is surrounded by a resin layer 30 including a nanoparticulate additive 35. In the doubly-modified coated particle 400, the nanoparticulate additive 25 in the surface copolymer layer 20 may be the same as or different from the nanoparticulate additive 35 in the resin layer 30.

The nanoparticulate additive 25, 35 may be any nanoparticulate material having an average particle size less than 1 micron (1000 nanometers), such as from 1 nanometer (nm) to 1000 nm, from 1 nm to 500 nm, from 10 nm to 500 nm, from 1 nm to 200 nm, from 1 nm to 100 nm, from 1 nm to 50 nm, from 1 nm to 25 nm, from 1 nm to 10 nm, or from 10 nm to 200 nm, for example, that is capable of mechanically strengthening a polymeric material when present within a matrix of the polymeric material. In embodiments, the nanoparticulate additive 25 of the surface copolymer layer 20, when present, may be chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, or ZrG5 nanoparticles, for example. In embodiments, the nanoparticulate additive 35 of the resin layer 30, when present, may be chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, or ZrG5 nanoparticles, for example. In embodiments for which a nanoparticulate additive 25 is present in the surface copolymer layer 20 and a nanoparticulate additive 35 is present in the resin layer, the nanoparticulate additives 25, 35 in the surface copolymer layer 20 and in the resin layer 30 may be independently chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these. ZrG nanoparticles are nanocomposites of zirconium hydroxide $(Zr(OH)_4)$ and graphene oxide. ZrG5 nanoparticles are nanocomposites of 95% by weight zirconium hydroxide $(Zr(OH)_4)$ and 5% by weight graphene oxide.

In embodiments, when a nanoparticulate additive 25 is present in the surface copolymer layer 20, the surface copolymer layer 20 may be a composite of the copolymer material and the nanoparticulate additive 25, in which the nanoparticulate additive 25 is distributed within a matrix of the copolymer material. The composite of the copolymer and at least one nanoparticulate additive 25 may include from 0.01% to 10% by weight nanoparticulate additive 25, based on the total weight of the composite. Likewise, when a nanoparticulate additive 35 is present in the resin layer 30, the resin layer 30 may be a composite of the cured resin and the nanoparticulate additive 35, in which the nanoparticulate additive 35 is distributed within a matrix of the cured resin. The composite of the cured resin and at least one nanoparticulate additive 35 may include from 0.01% to 10% by weight nanoparticulate additive, based on the total weight of the composite.

In one illustrative embodiment of a coated particle 100 (FIG. 1), the particulate substrate 10 may be a sand; the surface copolymer layer 20 may include a copolymer of polystyrene and poly(methyl methacrylate); and the resin layer 30 may include an epoxy resin chosen from bisphenol A epoxy resins, bisphenol F epoxy resins, Novolac epoxy resins, aliphatic epoxy resins, and glycidylamine epoxy resins.

In an illustrative embodiment of a modified-copolymer coated particle 200 (FIG. 2A), the particulate substrate 10 may be a sand; the surface copolymer layer 20 may include a copolymer of polystyrene and poly(methyl methacrylate); the surface copolymer layer 20 may be a composite of the copolymer and at least one nanoparticulate additive 25 distributed within the copolymer, the nanoparticulate additive 25 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these; and the resin layer 30 may include an epoxy resin chosen from bisphenol A epoxy resins, bisphenol F epoxy resins, Novolac epoxy resins, aliphatic epoxy resins, and glycidylamine epoxy resins.

In an illustrative embodiment of a modified-resin coated particle 300 (FIG. 2B), the particulate substrate 10 may be a sand, the surface copolymer layer 20 may include a copolymer of polystyrene and poly(methyl methacrylate); the resin layer 30 may include an epoxy resin chosen from bisphenol A epoxy resins, bisphenol F epoxy resins, Novolac epoxy resins, aliphatic epoxy resins, and glycidylamine epoxy resins; and the resin layer 30 may be a composite of the cured resin and at least one nanoparticulate additive 35 distributed within the epoxy resin, the nanoparticulate additive 35 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these.

In an illustrative embodiment of a doubly-modified coated particle 400 (FIG. 2C), the particulate substrate 10 may be a sand, the surface copolymer layer 20 may include a copolymer of polystyrene and poly(methyl methacrylate); the surface copolymer layer 20 may be a composite of the copolymer and at least one nanoparticulate additive 25 distributed within the copolymer, the nanoparticulate additive 25 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these; the resin layer 30 may include an epoxy resin chosen from bisphenol A epoxy resins, bisphenol F epoxy resins, Novolac epoxy resins, aliphatic epoxy resins, and glycidylamine epoxy resins; and the resin layer 30 may be a composite of the cured resin and at least one nanoparticulate additive 35 distributed within the epoxy resin, the nanoparticulate additive 35 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these, independently from the nanoparticulate additive 25 in the surface copolymer layer 20.

The effect of the choice of compositions of the various components of the coated particles 100 according to embodiments, namely, the surface copolymer layer 20, the resin layer 30, and any nanoparticulate additive 25, 35, may be illustrated by the mechanical properties of bulk polymer composites having compositions similar to those of an intended composition for a coated particle 100. Thermal and mechanical properties of example copolymer materials that may be included as the surface copolymer layer 20 of the coated particles 100 are summarized in Table 1. In Table 1, PS-PMMA is a copolymer of styrene and methyl methacrylate; rGO is reduced graphene oxide; the weight percent filler is based on the total weight of the composite of the polymer and the filler; $T_g$ is the glass transition temperature in degrees Celsius; and modulus and hardness are reported in gigapascals (GPa; $10^9$ Pascal).

TABLE 1

Thermal and Mechanical Properties of Co-polymer reinforced with different RGO wt %

| Polymer | Filler | Weight Percent Filler | Degradation temperature (° C.) | $T_g$ (° C.) | Modulus (GPa) | Hardness (GPa) |
|---|---|---|---|---|---|---|
| PS-PMMA | — | — | 392 | 91 | 3.815 | 0.1219 |
| PS-PMMA | rGO | 0.1% | 396 | 91 | 0.642 | 0.01438 |
| PS-PMMA | rGO | 1% | 397 | 91 | 2.66 | 0.0296 |
| PS-PMMA | rGO | 2% | 400 | 89.6 | 2.25 | 0.0264 |
| PS-PMMA | rGO | 4% | 404 | 89 | 1.37 | 0.053 |

In the following Table 2, thermal and mechanical properties are reported for nanocomposites of materials having compositions resembling those of coated particles 100 according to some embodiments of this disclosure. In Table 2, PS-PMMA is a copolymer of styrene and methyl methacrylate; hBN is hexagonal boron nitride; Epoxy is an epoxy resin formed by curing bisphenol A epichlorohydrin with diethylenetriamine curing agent; the graphene was xGnP-M-25 graphene nanoplatelet (XG Sciences, Inc.) approximately 5 nm to 8 nm thick with surface area from 120 square meters per gram (m$^2$/g) to 150 m$^2$/g; $T_m$ is the melting temperature of the nanocomposite in degrees Celsius; and modulus and hardness are reported in gigapascals ($10^9$ Pascal).

TABLE 2

Thermal and Mechanical Properties of nanocomposites for coating particulate substrates

| Polymer | Polymer Filler | Resin | Resin Filler | Degradation temperature (° C.) | $T_m$ (° C.) | Modulus (GPa) | Hardness (GPa) |
|---|---|---|---|---|---|---|---|
| — | — | Epoxy | — | 362 | — | 3.85 | 0.1868 |
| — | — | Epoxy | Graphene | 362 | 210 | 3.29 | 0.09014 |
| — | — | Epoxy | hBN | 363 | 220 | 3.859 | 0.166 |
| PS-PMMA | — | — | — | 393 | 185 | 3.815 | 0.1219 |
| PS-PMMA | Graphene | — | — | 390 | 180 | 3.63 | 0.09622 |
| PS-PMMA | hBN | — | — | 391 | 255 | 2.104 | 0.0455 |
| PS-PMMA | — | Epoxy | — | 362 | 195 | 4.093 | 0.1738 |
| PS-PMMA | Graphene | Epoxy | — | 370 | 150 | 3.47 | 0.1726 |
| PS-PMMA | hBN | Epoxy | — | 360 | 150 | 3.44 | 0.172 |
| PS-PMMA | — | Epoxy | Graphene | 363 | — | 2.01 | 0.0696 |
| PS-PMMA | — | Epoxy | hBN | — | 145 | 3.94 | 0.168 |
| PS-PMMA | Graphene | Epoxy | Graphene | 363 | 145 | 3.97 | 0.144 |
| PS-PMMA | hBN | Epoxy | hBN | 367 | 145 | 3.912 | 0.167 |

Figure 4:
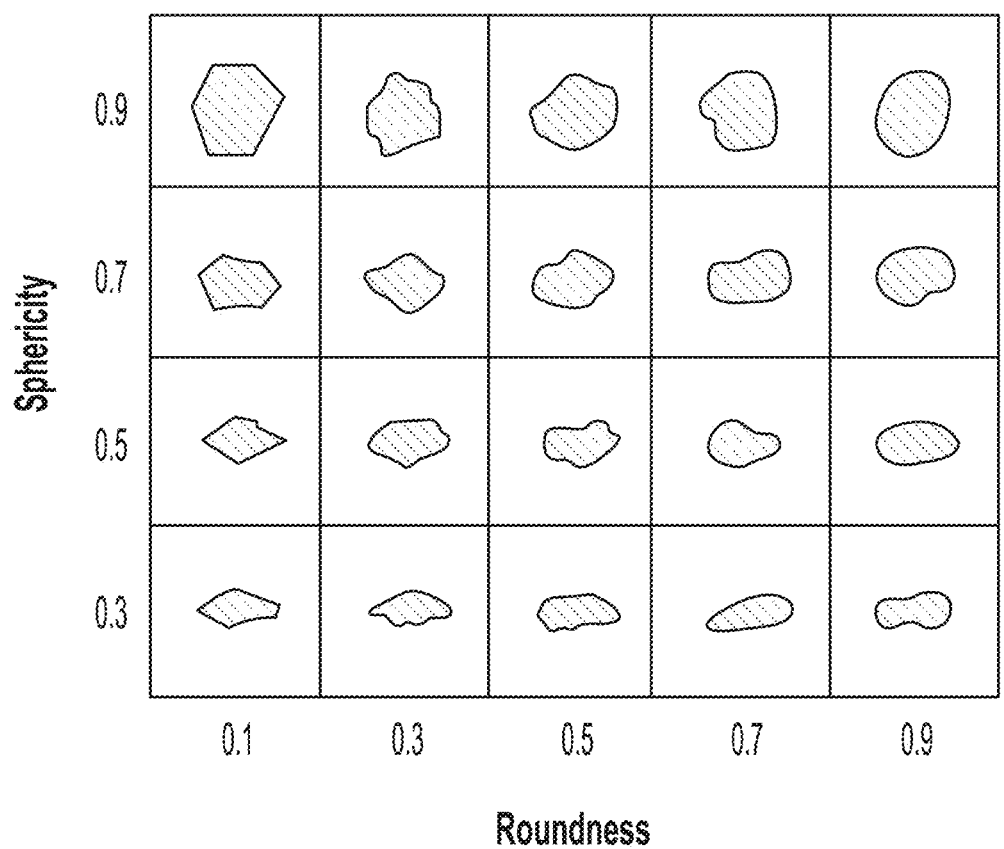
FIG. 4 is an exemplary standard table for assessing roundness values and sphericity values of particulate substrates and of coated particles according to embodiments.

The coated particles 100 according to embodiments of this disclosure may exhibit roundness and sphericity characteristics well suited for using the coated particles 100 in hydraulic fracturing processes. In particular, the coated particles 100 in some embodiments may have roundness values greater than 0.6, greater than 0.7, greater than 0.8, or greater than 0.9 and sphericity values also greater than 0.6, greater than 0.7, greater than 0.8, or greater than 0.9. Roundness and sphericity may be visually assessed from by optical microscopy by comparing physical characteristics of a particle against a standard table. An example standard table for assessing roundness and sphericity of particles is provided in FIG. 4.

Having previously described various embodiments of coated particles 100, methods of preparing the coated particles 100 will now be described. Methods for preparing coated particles may include preparing a first mixture including at least one polymerizable material, an initiator, and a solvent. The first mixture is contacted with a particulate substrate to form a polymerization mixture. The polymerization mixture is heated to cure the polymerizable material and form a polymer-coated particulate comprising the particulate substrate and a surface copolymer layer surrounding the particulate substrate. A second mixture is prepared, containing the polymer-coated substrate, an uncured resin, and a solvent. A curing agent is added to the second mixture to cure the uncured resin and form the coated particle 100 (FIG. 1). Thus, the coated particle included the particulate substrate 10, the surface copolymer layer 20 surrounding the particulate substrate 10, and a resin layer 30 surrounding the surface copolymer layer 20, the resin layer 30 comprising a cured resin.

In embodiments of methods for preparing the coated particles 100, the at least one polymerizable material includes at least two monomers chosen from styrene, methyl methacrylate, ethylene, propylene, butylene, imides, urethanes, sulfones, carbonates, and acrylamides. The copolymer of the surface copolymer layer 20 results from the chemical polymerization reaction of the at least two monomers in the polymerization mixture.

In embodiments of methods for preparing the coated particles 100, the uncured resin is chosen from materials that, when cured, form a cured resin chosen from bisphenol A epoxy resins, bisphenol F epoxy resins, Novolac epoxy resins, aliphatic epoxy resins, and glycidylamine epoxy resins.

In embodiments of methods for preparing the coated particles 100, the particulate substrate 10 may be any particulate substrate described previously in this disclosure as the particulate substrate 10 of the coated particle 100. In some embodiments, the particulate substrate 10 is a sand.

In some embodiments of methods for preparing the coated particles 100, the first mixture, the second mixture, or both the first mixture and the second mixture, may further include at least one nanoparticulate additive. In such embodiments, the at least one nanoparticulate additive in the first mixture, the second mixture, or both the first mixture and the second mixture, may be chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles. It should be readily understood that any nanoparticulate additive present in the first mixture will be present in the surface copolymer layer 20 of the coated particle 100. Similarly, any nanoparticulate additive first added into the second mixture and not present in the polymerized surface copolymer layer 20 will be present in the resin layer 30 of the coated particle 100. In illustrative embodiments, the at least one nanoparticulate additive in the first mixture, the second mixture, or both the first mixture and the second mixture is chosen from graphene nanoparticles, graphene oxide nanoparticles, and hexagonal boron nitride nanoparticles.

The coated particles 100 as previously described in this disclosure, including but not limited to coated particles 100 prepared according to the methods described in this disclosure, may be incorporated into a hydraulic fracturing composition. Example hydraulic fracturing compositions according to embodiments may include a fluid medium; and coated particles 100 according to one or more than one embodiment of this disclosure, dispersed within the fluid medium.

The fluid medium of the hydraulic fracturing composition may include a base fluid, not limited to one of oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination of these. Suitable aqueous-based fluids may include fresh water, saltwater (for example, water containing one or more salts dissolved in the water), brine (for example, saturated salt water), seawater, and any combination of these. Suitable aqueous-miscible fluids may include, but not be limited to, alcohols (for example, methanol, ethanol, n-propanol, isopropanol, n-butanol, sec-butanol, isobutanol, and t-butanol), glycerins, glycols (for example, polyglycols, propylene glycol, and ethylene glycol), polyglycol amines, polyols, any derivative of these, any of these in combination with salts (for example, sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination.

Further examples of the fluid medium may include water-in-oil emulsions, also known as invert emulsions, with oil-to-water ratio from a lower limit of greater than 50:50, 55:45, 60:40, 65:35, 70:30, 75:25, or 80:20 to an upper limit of less than 100:0, 95:5, 90:10, 85:15, 80:20, 75:25, 70:30, or 65:35 by volume in the base fluid, where the amount may range from any lower limit to any upper limit and encompass any subset between any of these values.

In some embodiments, the fluid medium including the coated particles 100 may further include an additive such as a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, an oxidizer, a reducer, a friction reducer, a clay stabilizing agent, and any combination of any of these.

The hydraulic fracturing compositions including the coated particles 100 according to embodiments of this disclosure may be incorporated into methods for treating subterranean formations. Example methods for treating subterranean formations include, but are not limited to, hydraulic fracturing. Example methods for treating a subterranean formation may include contacting a subterranean formation with a hydraulic fracturing composition as previously described, including coated particles 100 according to at least one embodiment of this disclosure. The methods may further include propagating at least one subterranean fracture in the subterranean formation with the hydraulic fracturing fluid.

Subterranean formations such as rock, coal, or shale are treated by pumping a hydraulic fracturing fluid containing the coated particles 100 into an opening in the formation to aid propagation of a fracture. The pressure of the injecting fluid causes the formation to fracture, and while the fluid is allowed to flow back to the surface, the coated particles 100 remain in the fracture and prevent the formation from closing or collapsing.

Though embodiments of the present disclosure have been discussed in the context of hydraulic fracturing processes, embodiments of the present disclosure may also be used in other industries. For instance, in some embodiments, the coated particles 100 and the hydraulic fracturing compositions including the coated particles 100 may be used to stimulate groundwater wells, to precondition or induce rock cave-ins for mining operations, to dispose of waste by injecting it deeply into rock, to measure stresses in the Earth's crust, to generate electricity in enhanced geothermal systems, or to increase injection rates for the geologic sequestration of carbon dioxide.

Unless otherwise defined, all technical and scientific terms used in this disclosure have the same meaning as commonly understood by one of ordinary skill in the art to which the invention belongs. The terminology used in the description is for describing particular embodiments only and is not intended to be limiting. As used in the specification and appended claims, the singular forms "a," "an," and "the" are intended to include the plural forms as well, unless the context clearly indicates otherwise.

EXAMPLES

The following examples are offered by way of illustration of the embodiments of this disclosure. One skilled in the art will recognize that the following examples are not meant to be limiting to the scope of the disclosure or its appended claims.

Example 1

Application of First Layer of Polymeric Material

This Example demonstrates the application of a first layer of polymeric material to a particulate substrate. In this Example, the polymeric material is a copolymer of polystyrene and poly(methyl methacrylate) and the particulate substrate is Saudi sand.

A coating solution is prepared that includes monomers, initiator, and solvent. To prepare the coating solution, 2.5 milliliters (mL) styrene monomer, 2.5 mL methyl methacrylate monomer, and 150 milligrams (mg) of initiator (2,2'-azobis(2-methylpropionitrile); "AIBN") are mixed. The resulting coating solution is stirred at room temperature (25° C.±2° C.) until the initiator is dissolved. The coating solution then is added to 300 g of pre-modified Saudi sand. The pre-modification of the Saudi sand includes mixing with 150 mg of AIBN that is dissolved in 100 mL of acetone, followed by vigorous mixing and subsequent drying at 45° C. for 24 hours. The coated sand is then heated at 70° C. to initiate and carry out in situ polymerization. After about 8 hours, when the polymerization is complete, the coated sand is dried.

Example 2

Application of First Layer of Polymeric Material and Nanoparticulate Additive This Example demonstrates the application of a first layer of polymeric material to a particulate substrate, for which the first layer further includes a nanoparticulate additive. In this Example, the polymeric material is a copolymer of polystyrene and poly(methylmethacrylate), the particulate substrate is Saudi sand, and the nanoparticulate additive is graphene. In exemplary trials, the graphene was xGnP-M-25, (obtained from XG Sciences, Inc.), containing graphene nanoplatelets approximately 5 nm to 8 nm thick with a typical surface area of 120 $m^2/g$ to 150 $m^2/g$.

A coating solution is prepared that includes monomers, initiator, nanoparticulate additive, and solvent. To prepare the coating solution, 2.5 mL styrene monomer, 2.5 mL methyl methacrylate monomer, 150 mg of AIBN initiator, and a predetermined amount of graphene are added. The resulting coating solution is stirred at room temperature (25° C.±2° C.) until the initiator is dissolved. The coating solution then is added to 300 g of pre-modified Saudi sand. The pre-modification of the Saudi sand includes mixing with 150 mg of AIBN that is dissolved in 100 mL of acetone, followed by vigorous mixing and subsequent drying at 45° C. for 24 hours. The coated sand is then heated at 70° C. to initiate and carry out in situ polymerization. After about 8 hours, when the polymerization is complete, the coated sand is dried.

Example 3

Application of Resin Second Layer to Polymer-Coated Particles

This Example demonstrates the application of a second layer, in particular a resin layer, to the polymer-coated particles prepared according to Example 1 or Example 2.

To apply a second layer of resin to the polymer-coated particles, a desired amount of the polymer-coated particles prepared according to Example 1 or Example 2 are heated at 300 degrees Fahrenheit (° F.) (149° C.) until the temperature of the particles is stable. Separately, an uncured resin is diluted with a solvent such as methanol to form a resin solution that is approximately 10 wt. % resin, based on the total weight of the resin and the solvent. A curing agent is added to the resin solution. In specific examples, the resin may be an epoxy resin formed as the product of curing bisphenol A epichlorohydrin with diethylenetriamine curing agent.

Subsequently, the resin solution is added by syringe to the surface of the polymer-coated particles while the particles and the resin solution are mixed at about 350 revolutions per minute and the temperature is maintained. A spatula may be inserted into the particles in the mixing apparatus to facilitate mixing. When the particles visibly appear to be sticking together, water is added dropwise to the mixture to quench the resin curing reaction. The mixture is then further stirred for approximately 5 minutes, or until no water vapor is visible on the walls of the vessel in which the reaction is being conducted. The product, a sand coated with a first layer of polymeric material and a second layer of cured resin over the first layer, is allowed to cool then is recovered for further use or testing.

Example 4

Application of Second Layer Including Resin and Nanoparticulate Additive to Polymer-Coated Particles This Example demonstrates the application of a second layer, in particular a resin layer including a nanoparticulate additive, to the polymer-coated particles prepared according to Example 1 or Example 2.

To apply a second layer of resin including a nanoparticulate additive to the polymer-coated particles, a desired amount of the polymer-coated particles prepared according to Example 1 or Example 2 are heated at 300° F. (149° C.) until the temperature of the particles is stable. Separately, an uncured resin is diluted with a solvent such as methanol to form a resin solution that is approximately 10 wt. % resin, based on the total weight of the resin and the solvent. A curing agent and a desired amount of nanoparticulate additive are added to the resin solution.

Subsequently, the resin solution containing the nanoparticulate additive is added by syringe to the surface of the polymer-coated particles while the particles and the resin solution are mixed at about 350 revolutions per minute and the temperature is maintained. A spatula may be inserted into the particles in the mixing apparatus to facilitate mixing. When the particles visibly appear to be sticking together, water is added dropwise to the mixture to quench the resin curing reaction. The mixture is then further stirred for approximately 5 minutes, or until no water vapor is visible on the walls of the vessel in which the reaction is being conducted. The product, a sand coated with a first layer of polymeric material and a second layer of cured resin over the first layer, is allowed to cool then is recovered for further use or testing.

Example 5

Crush Testing of Coated Particles

Coated particles prepared according to the previous examples were tested for crush strength under ISO standard procedure ISO+13503-2-2006, incorporated by reference into this disclosure in its entirety. In the procedure, a hydraulic load frame capable of applying crushing stress to 103 megapascals (MPa) (15,000 pounds per square inch (psi)) were used to test the crush resistance of uncoated sand and the coated particles having sand as the particulate substrate. The samples were sieved so that all particles tested were within the specified size range. The percentage of samples crushed were measured at stress levels of 2500 psi (17.2 MPa), 3000 psi (20.7 MPa), 5000 psi (34.5 MPa), 7500 psi (51.7 MPa), 10000 psi (68.9 MPa), and 12500 psi (86.2 MPa). The percentage crushed was assessed by conducting a sieve analysis on the particle residue after crushing to determine the amount of residue that falls below the smallest mesh of sieves. The reported value, therefore, refers to the weight of coated particles that have failed under pressure, as a percent of the total weight of the coated particles tested.

TABLE 3

Crush Testing Results for various Uncoated and Coated Particles

| | | Percent sand crushed at various pressures | | | | | |
|---|---|---|---|---|---|---|---|
| Trial | Sand Type | 2500 psi | 3000 psi | 5000 psi | 7500 psi | 10000 psi | 12500 psi |
| A | Uncoated (comparative) | 5% | 7% | 22% | 32% | 37% | 42% |
| B | PS-PMMA + resin/graphene (1 wt. %) | 2% | 2% | 7% | 17% | 23% | 28% |
| C | PS-PMMA + resin/graphene (4 wt. %) | 3% | 3% | 4% | 9% | 16% | 19% |
| D | PS-PMMA + graphene (comparative) | 2% | 2% | 7% | 17% | 22% | 26% |
| E | PMMA + graphene (comparative) | 4% | 6% | 18% | 27% | 36% | 38% |

In Table 3, trial (A) was untreated Saudi sand; trial (B) was Saudi sand surrounded by a copolymer layer of polystyrene-co-poly(methyl methacrylate), in which the copolymer layer was surrounded by an epoxy layer containing a graphene nanoparticulate additive, where the weight ratio of the epoxy layer to sand was 1%; trial (C) was a Saudi sand surrounded by a copolymer layer of polystyrene-co-poly(methyl methacrylate), in which the copolymer layer was surrounded by an epoxy layer containing a graphene nanoparticulate additive, where weight ratio of the epoxy layer to sand was 4%; trial (D) was Saudi sand surrounded by a layer of polystyrene-co-poly(methyl methacrylate) including a graphene nanoparticulate additive or filler; and trial (E) was Saudi sand surrounded by a layer of poly(methyl methacrylate) including a graphene nanoparticulate additive or filler. In trials (B) and (C), the resin was an epoxy resin product of curing bisphenol A epichlorohydrin with diethylenetriamine curing agent.

Example 6

Morphology of Coated Particles

Coated particles including Saudi sand as a particulate substrate, a surface copolymer layer surrounding the particulate substrate and optionally including a nanoparticulate additive, and a resin layer surrounding the surface copolymer layer and optionally including a nanoparticulate additive, were prepared according to the previous Examples. As comparative examples, coated particles were prepared that lacked either a surface copolymer layer or a resin layer. The samples were analyzed by optical microscopy to determine physical morphology, particularly with respect to roundness and sphericity. The roundness and sphericity values were determined by comparing the shapes of the coated particles against exemplary particle shapes in the standard table of FIG. 4.

Figure 5:
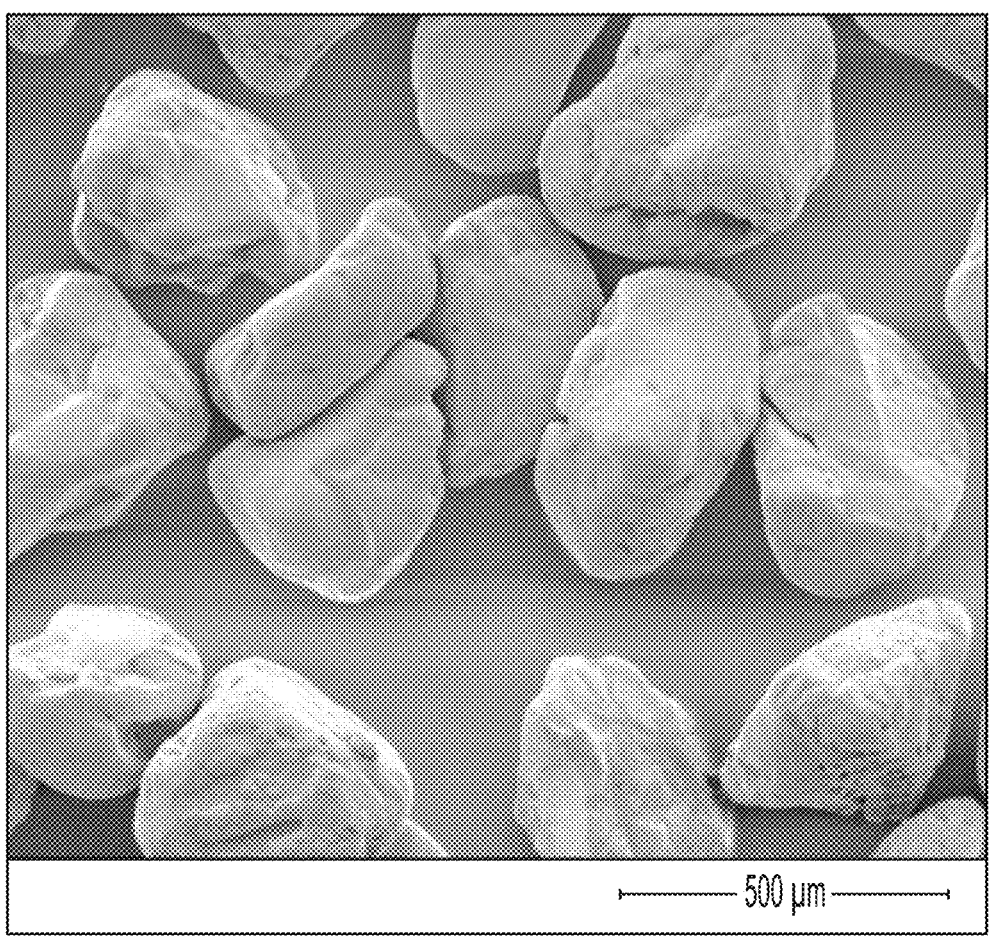
FIG. 5 is an optical micrograph of an example particulate substrate, particularly a neat sand, for coated particles according to embodiments.

Optical or scanning-electron micrographs of the various uncoated and coated particles are provided in FIGS. 5, 6A-6E, 7A-7B, 8A-8B, 9A-9B, 10A-10D, and 11. The particles in FIGS. 5, 6A-6E, 7A-7B represent the comparative examples. Specifically, FIG. 5 is a scanning-electron micrograph of virgin, uncoated Saudi sand. FIGS. 6A-6E are optical micrographs of Saudi sands coated with a resin layer alone (FIG. 6A) or with a resin layer including a nanoparticulate additive (FIGS. 6B-6E). FIGS. 7A and 7B are scanning-electron micrographs of Saudi sands coated with a copolymer layer of PS-PMMA, with or without a graphene nanoparticulate additive in the copolymer layer. FIG. 8A is a scanning-electron micrograph of Saudi sands coated with a copolymer layer of PS-PMMA and a resin layer. FIG. 8B is an optical micrograph of Saudi sands coated with a copolymer layer of PS-PMMA and a resin layer including nanoparticulate additive. FIGS. 9A and 9B are micrographs of Saudi sands coated with a copolymer layer and a resin layer, in which the copolymer layer includes nanoparticulate additive and the resin layer does not include nanoparticulate additive (FIG. 9A) or does include graphene nanoparticulate additive (FIG. 9B). FIGS. 10A-10D are micrographs of Saudi sands coated with a copolymer layer, in which hexagonal boron nitride nanoparticulate additive is present in one or both of the copolymer layer or a resin layer on the copolymer layer. FIG. 11 is a scanning-electron micrograph of Saudi sands coated with a copolymer layer without nanoparticulate, and a resin layer including a ZrG nanoparticulate additive (ZrG is a nanocomposite of zirconium hydroxide and graphene oxide). Table 4 summarizes the observations of roundness and sphericity for the coated particles, as visually determined from the micrographs. In all examples of Table 4, the resin was an epoxy resin product of curing bisphenol A epichlorohydrin with diethylenetriamine curing agent.

TABLE 4

Morphology, Roundness, and Sphericity of Various Uncoated and Coated Particles

| Figure | Polymer | Polymer Nanoparticulate | Resin | Resin Nanoparticulate | Average Roundness | Average Sphericity |
|---|---|---|---|---|---|---|
| FIG. 5 (comparative) | | Uncoated Saudi Sand | | | 0.3 | 0.3 |

TABLE 4-continued

Morphology, Roundness, and Sphericity of Various Uncoated and Coated Particles

Figure 6A:
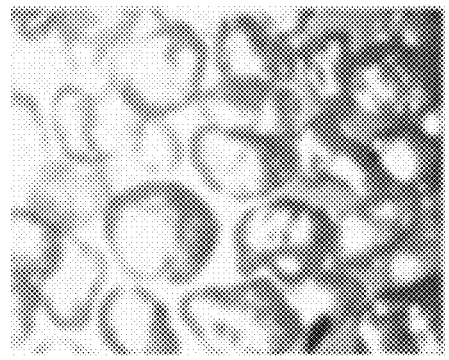
FIG. 6A is an optical micrograph of particles coated with a layer of cured epoxy resin without a nanoparticulate additive in the resin layer.
Figure 6B:
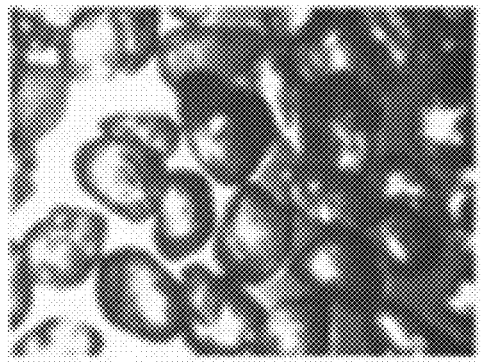
FIG. 6B is an optical micrograph of particles coated with a layer of cured epoxy resin, with graphene nanoparticulate additive in the resin layer.
Figure 6C:
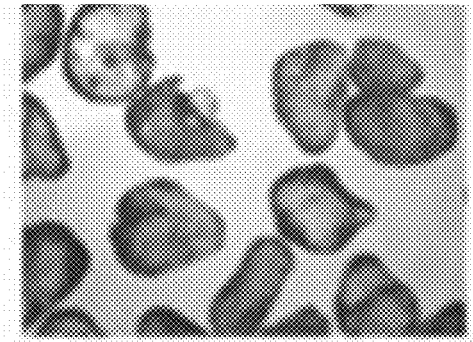
FIG. 6C is an optical micrograph of particles coated with a layer of cured epoxy resin, with zirconia nanoparticulate additive in the resin layer.
Figure 6D:
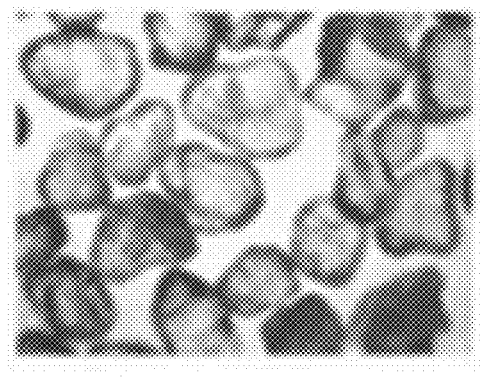
FIG. 6D is an optical micrograph of particles coated with a layer of cured epoxy resin, with zirconia/graphene composite nanoparticulate additive in the resin layer.
Figure 6E:
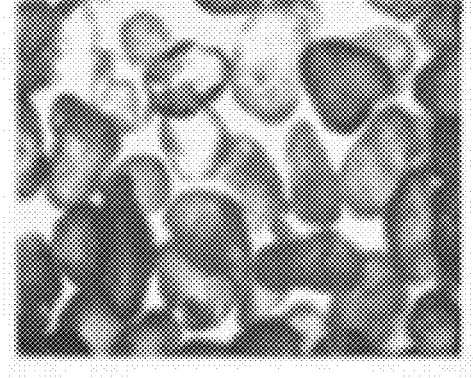
FIG. 6E is an optical micrograph of particles coated with a layer of cured epoxy resin, with hexagonal boron nitride nanoparticulate additive in the resin layer.
Figure 7A:
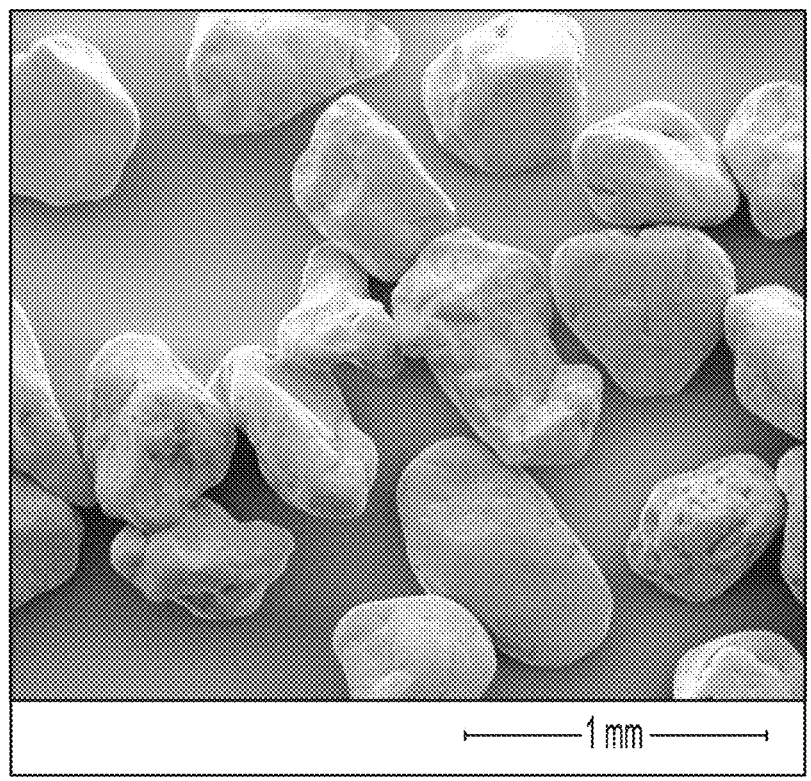
FIG. 7A is a scanning-electron micrograph of Saudi sands coated with a surface copolymer layer of PS-PMMA.
Figure 7B:
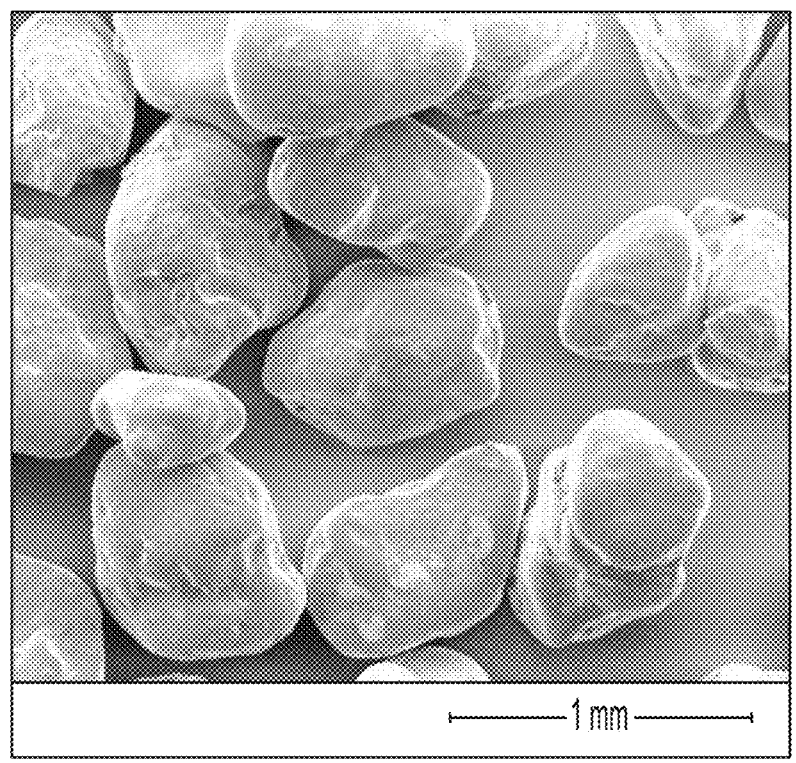
FIG. 7B is a scanning-electron micrograph of Saudi sands coated with a surface copolymer layer of PS-PMMA including graphene nanoparticulate additive in the copolymer layer.
Figure 8A:
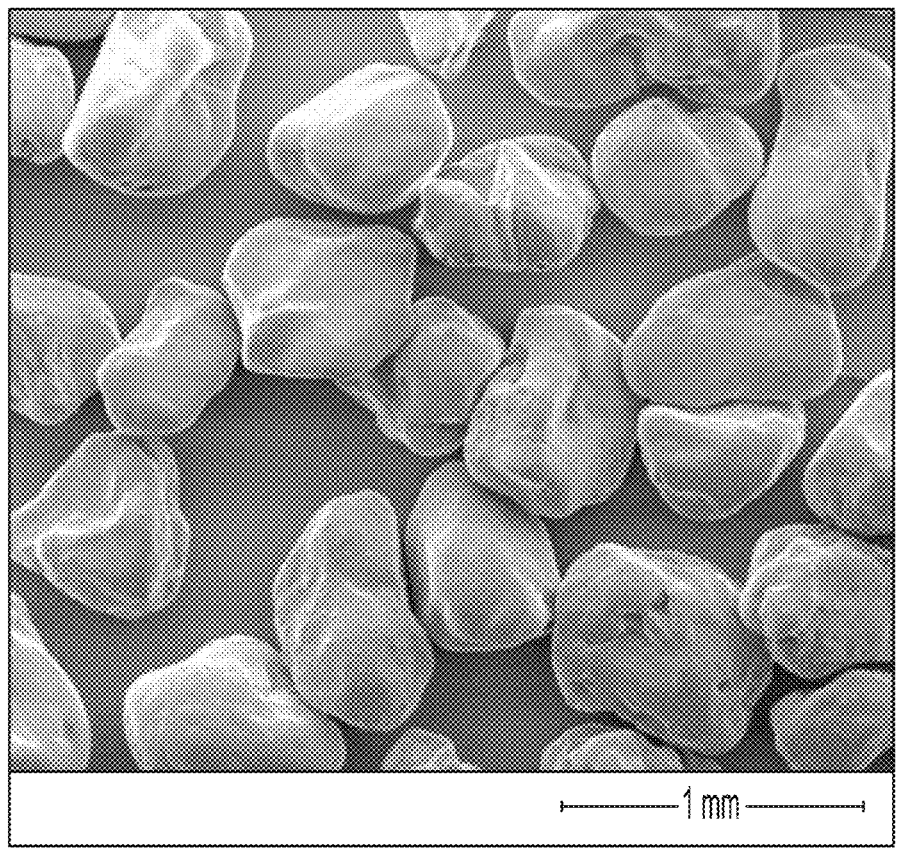
FIG. 8A is a scanning-electron micrograph of Saudi sands coated with a surface copolymer layer of PS-PMMA and a resin layer.
Figure 8B:
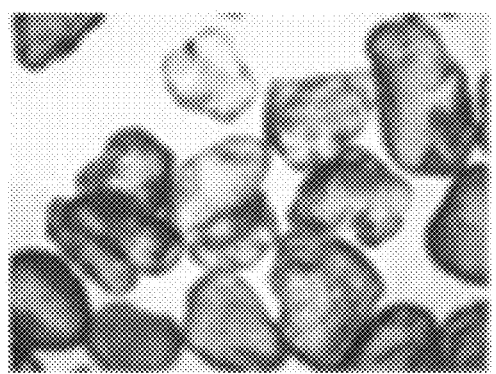
FIG. 8B is an optical micrograph of Saudi sands coated with a surface copolymer layer of PS-PMMA and a resin layer including nanoparticulate additive.
Figure 9A:
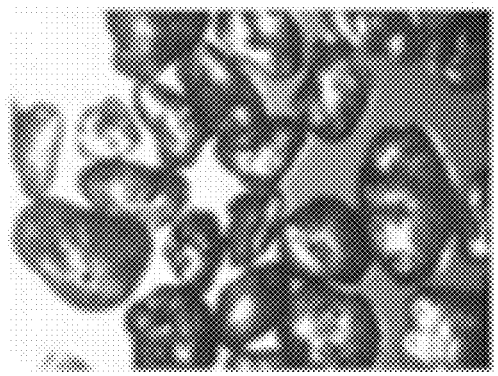
FIG. 9A is an optical micrograph of Saudi sands coated with a surface copolymer layer and a resin layer, in which the copolymer layer includes nanoparticulate additive and the resin layer does not include nanoparticulate additive.
Figure 9B:
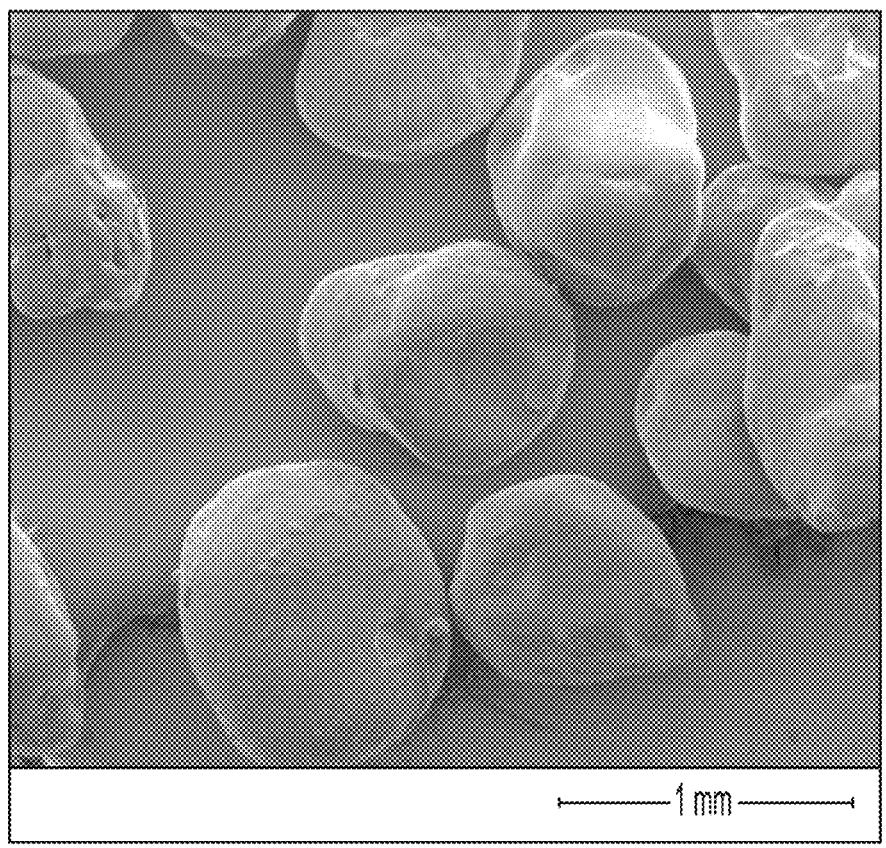
FIG. 9B is a scanning-electron micrograph of Saudi sands coated with a surface copolymer layer and a resin layer, in which both the copolymer layer and the resin layer include graphene nanoparticulate additive.
Figure 10A:
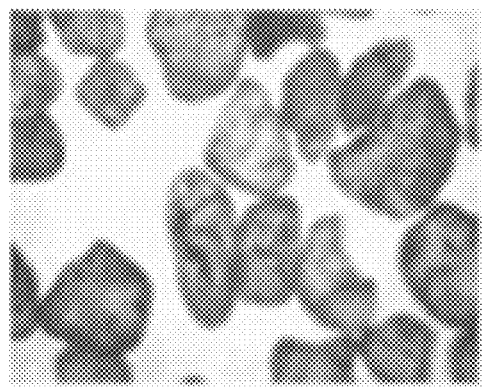
FIG. 10A is an optical micrograph of Saudi sands coated with a surface copolymer layer including a hexagonal boron nitride nanoparticulate additive.
Figure 10B:
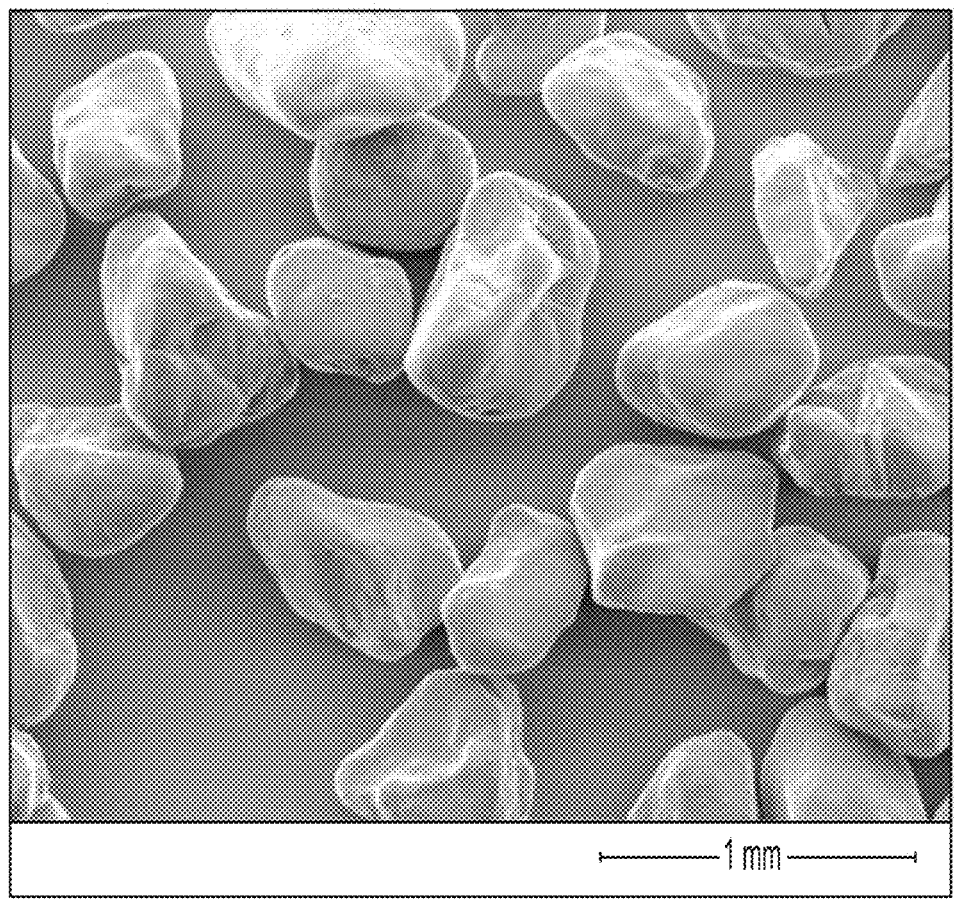
FIG. 10B is a scanning-electron micrograph of Saudi sands coated with a surface copolymer layer and a resin layer, in which the copolymer layer does not include nanoparticulate additive and the resin layer includes a hexagonal boron nitride nanoparticulate additive.
Figure 10C:
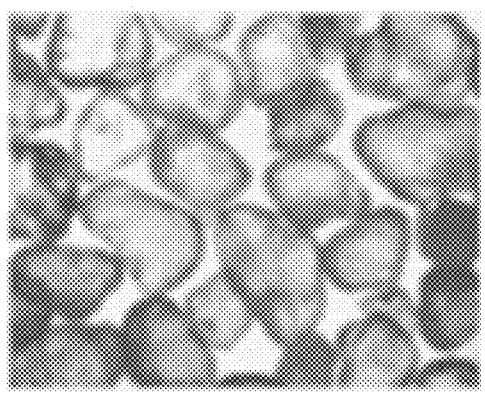
FIG. 10C is an optical micrograph of Saudi sands coated with a surface copolymer layer and a resin layer, in which the copolymer layer includes a hexagonal boron nitride nanoparticulate additive and the resin layer does not include a nanoparticulate additive.
Figure 10D:
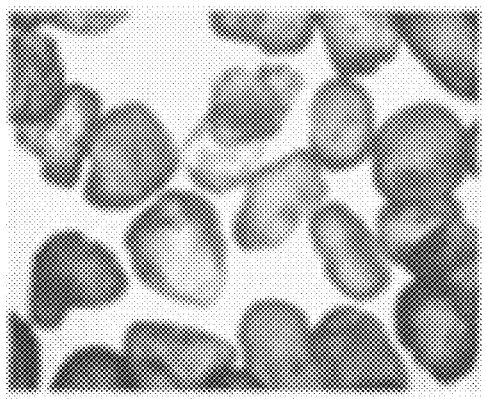
FIG. 10D is an optical micrograph of Saudi sands coated with a surface copolymer layer and a resin layer, in which both the copolymer layer and the resin layer include a hexagonal boron nitride nanoparticulate additive.
Figure 11:
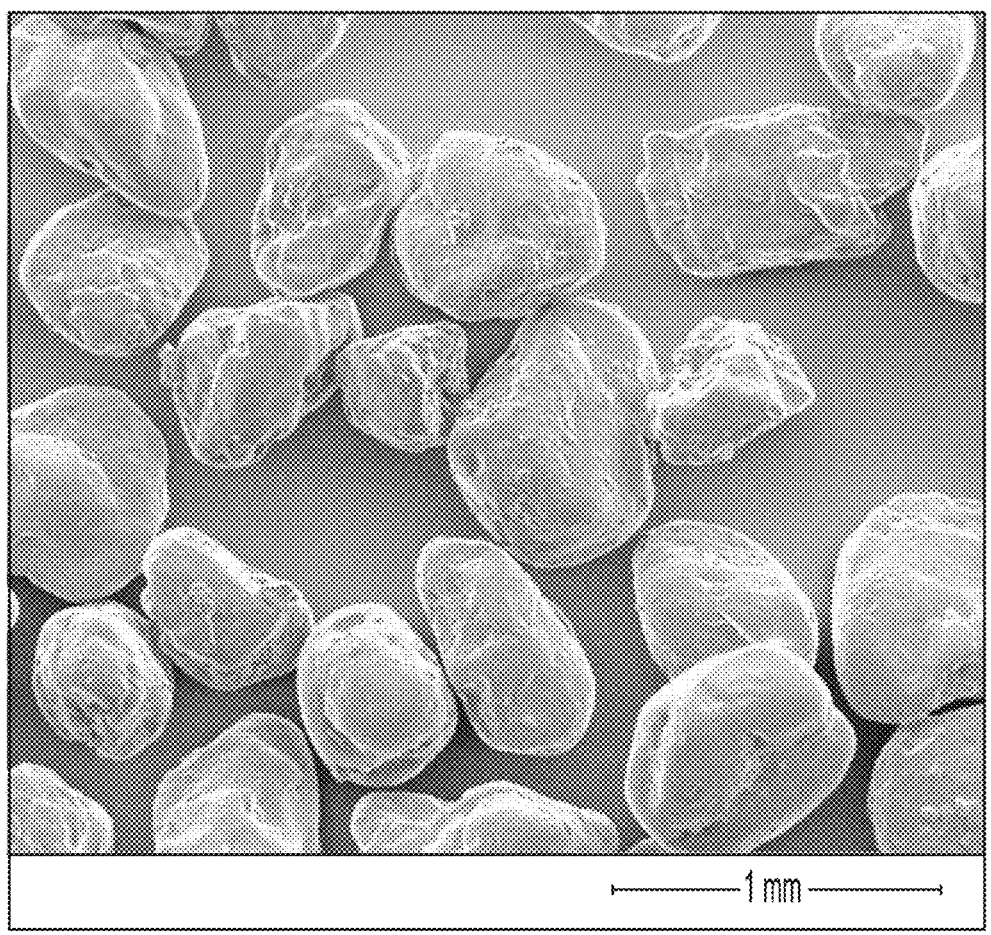
FIG. 11 is a scanning-electron micrograph of Saudi sands coated with a surface copolymer layer and a resin layer, in which the resin layer includes a ZrG nanoparticulate additive (ZrG is a nanocomposite of zirconium hydroxide and graphene oxide).

| Figure | Polymer | Polymer Nanoparticulate | Resin | Resin Nanoparticulate | Average Roundness | Average Sphericity |
|---|---|---|---|---|---|---|
| FIG. 6A (comparative) | — | — | Epoxy | — | 0.5 | 0.9 |
| FIG. 6B (comparative) | — | — | Epoxy | Graphene | 0.7 | 0.7 |
| FIG. 6C (comparative) | — | — | Epoxy | $ZrO_2$ | 0.9 | 0.5 |
| FIG. 6D (comparative) | — | — | Epoxy | $ZrO_2$/Graphene | 0.3 | 0.7 |
| FIG. 6E (comparative) | — | — | Epoxy | hBN | 0.7 | 0.5 |
| FIG. 7A (comparative) | PS-PMMA | — | — | — | 0.5 | 0.5 |
| FIG. 7B (comparative) | PS-PMMA | Graphene | — | — | 0.7 | 0.7 |
| FIG. 8A | PS-PMMA | — | Epoxy | — | 0.7 | 0.9 |
| FIG. 8B | PS-PMMA | — | Epoxy | Graphene | 0.7 | 0.9 |
| FIG. 9A | PS-PMMA | Graphene | Epoxy | — | 0.9 | 0.7 |
| FIG. 9B | PS-PMMA | Graphene | Epoxy | Graphene | 0.9 | 0.7 |
| FIG. 10A | PS-PMMA | hBN | — | — | 0.5 | 0.5 |
| FIG. 10B | PS-PMMA | — | Epoxy | hBN | 0.7 | 0.7 |
| FIG. 10C | PS-PMMA | hBN | Epoxy | — | 0.7 | 0.7 |
| FIG. 10D | PS-PMMA | hBN | Epoxy | hBN | 0.9 | 0.7 |
| FIG. 11 | PS-PMMA | — | Epoxy | ZrG | 0.9 | 0.7 |

The roundness and sphericity values for the various coated particles demonstrate that coated particles according to embodiments of this disclosure possess characteristics rendering them suitable for use as particles in hydraulic fracturing operations. In particular, coated particles having both roundness and sphericity values greater than 0.6 or 0.7 are believed to withstand greater pressures and have greater crush strengths than particles for which either value or both values are less than 0.6.

Items Listing

Item 1: A coated particle comprising: a particulate substrate; a surface copolymer layer surrounding the particulate substrate, the surface copolymer layer comprising a copolymer of at least two monomers chosen from styrene, methyl methacrylate, ethylene, propylene, butylene, imides, urethanes, sulfones, carbonates, and acrylamides; and a resin layer surrounding the surface copolymer layer, the resin layer comprising a cured resin.

Item 2: The coated particle of item 1, in which the particulate substrate is chosen from oxide particles, silicate particles, sands, ceramic particles, resin particles, plastic particles, mineral particles, glass particles, silica particles, alumina particles, fumed carbon particles, carbon black, graphite, mica, titania, zirconia, boron, fly ash, or combinations thereof.

Item 3: The coated particle of item 1 or item 2, in which the particulate substrate is a sand.

Item 4: The coated particle of any of items 1-3, in which the surface copolymer layer comprises a copolymer of styrene and methyl methacrylate.

Item 5: The coated particle of any of items 1-4, in which the cured resin is an epoxy resin and is chosen from bisphenol A epoxy resins, bisphenol F epoxy resins, Novolac epoxy resins, aliphatic epoxy resins, and glycidylamine epoxy resins.

Item 6: The coated particle of any of items 1-5, in which the surface copolymer layer, the resin layer, or both the surface copolymer layer and the resin layer, comprises at least one nanoparticulate additive.

Item 7. The coated particle of any of items 1-6, in which the surface copolymer layer is a composite of the copolymer and at least one nanoparticulate additive distributed within the polymeric material.

Item 8: The coated particle of item 6 or 7, in which the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

Item 9: The coated particle of any of items 6-8, in which the composite of the copolymer and at least one nanoparticulate additive comprises from 0.1% to 10% by weight nanoparticulate additive, based on the total weight of the composite.

Item 10: The coated particle of any of items 1-6, in which the resin layer is a composite of the cured resin and at least one nanoparticulate additive distributed within the cured resin.

Item 11: The coated particle of item 10, in which the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

Item 12: The coated particle of item 10 or 11, in which the composite of the cured resin and at least one nanoparticulate additive comprises from 0.1% to 10% by weight nanoparticulate additive, based on the total weight of the composite.

Item 13: The coated particle of any of items 1-6, in which the surface copolymer layer is a composite of the copolymer and at least one nanoparticulate additive distributed within the copolymer; and the resin layer is a composite of the cured resin and at least one nanoparticulate additive distributed within the cured resin.

Item 14: The coated particle of item 13, in which the nanoparticulate additives in the surface copolymer layer and in the resin layer are independently chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these.

Item 15: The coated particle of item 1, in which: the particulate substrate is sand; the surface copolymer layer comprises a copolymer of polystyrene and poly(methyl methacrylate); and the resin layer comprises an epoxy resin is chosen from bisphenol A epoxy resins, bisphenol F epoxy resins, Novolac epoxy resins, aliphatic epoxy resins, and glycidylamine epoxy resins.

Item 16: The coated particle of item 1, in which: the particulate substrate is sand; the surface copolymer layer comprises a copolymer of polystyrene and poly(methyl methacrylate); the surface copolymer layer is a composite of the copolymer and at least one nanoparticulate additive distributed within the copolymer; and the resin layer comprises an epoxy resin chosen from bisphenol A epoxy resins, bisphenol F epoxy resins, Novolac epoxy resins, aliphatic epoxy resins, and glycidylamine epoxy resins.

Item 17: The coated particle of item 1, in which: the particulate substrate is sand; the surface copolymer layer comprises a copolymer of polystyrene and poly(methyl methacrylate); the surface copolymer layer is a composite of the copolymer and at least one nanoparticulate additive distributed within the copolymer; and the resin layer comprises an epoxy resin is chosen from bisphenol A epoxy resins, bisphenol F epoxy resins, Novolac epoxy resins, aliphatic epoxy resins, and glycidylamine epoxy resins; and the resin layer is a composite of the cured resin and at least one nanoparticulate additive distributed within the epoxy resin.

Item 18: The coated particle of item 1, in which: the particulate substrate is sand; the surface copolymer layer comprises a copolymer of polystyrene and poly(methyl methacrylate); the surface copolymer layer is a composite of the polymeric material and at least one nanoparticulate additive distributed within the polymeric material; the resin layer comprises an epoxy resin chosen from bisphenol A epoxy resins, bisphenol F epoxy resins, Novolac epoxy resins, aliphatic epoxy resins, and glycidylamine epoxy resins; and the resin layer is a composite of the cured resin and at least one nanoparticulate additive distributed within the epoxy resin.

Item 19: A method of preparing a coated particle, the method comprising: preparing a first mixture comprising at least one polymerizable material, an initiator, and optionally a solvent; contacting the first mixture to a particulate substrate to form a polymerization mixture; heating the polymerization mixture to cure the polymerizable material and form a polymer-coated particulate comprising the particulate substrate and a surface copolymer layer surrounding the particulate substrate; preparing a second mixture comprising the polymer-coated substrate, an uncured resin, and a solvent; adding a curing agent to the second mixture to cure the uncured resin and form the coated particle, the coated particle comprising the particulate substrate, the surface copolymer layer surrounding the particulate substrate, and a resin layer surrounding the surface copolymer layer, the resin layer comprising a cured resin.

Item 20: The method of item 19, in which: the at least one polymerizable material comprises at least two monomers chosen from styrene, methyl methacrylate, ethylene, propylene, butylene, imides, urethanes, sulfones, carbonates, and acrylamides; the cured resin is chosen from bisphenol A epoxy resins, bisphenol F epoxy resins, Novolac epoxy resins, aliphatic epoxy resins, and glycidylamine epoxy resins.

Item 21: The method of item 19 or 20, in which the particulate substrate is a sand.

Item 22: The method of any of items 19-21, in which the first mixture, the second mixture, or both the first mixture and the second mixture, further comprises at least one nanoparticulate additive.

Item 23: The method of item 22, in which the at least one nanoparticulate additive in the first mixture, the second mixture, or both the first mixture and the second mixture, is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

Item 24: The method of item 22, in which the at least one nanoparticulate additive in the first mixture, the second mixture, or both the first mixture and the second mixture, is chosen from graphene nanoparticles, graphene oxide nanoparticles, carbon nanotubes, and hexagonal boron nitride nanoparticles.

Item 25: A hydraulic fracturing composition comprising: a fluid medium; and coated particles according to any of items 1-18 dispersed within the fluid medium.

Item 26: A method of treating a subterranean formation, the method comprising: contacting a subterranean formation with a hydraulic fracturing composition according to item 25; and propagating at least one subterranean fracture in the subterranean formation with the hydraulic fracturing fluid.

It is noted that the terms "substantially" and "about" may be utilized herein to represent the inherent degree of uncertainty that may be attributed to any quantitative comparison, value, measurement, or other representation. These terms are also utilized in this disclosure to represent the degree by which a quantitative representation may vary from a stated reference without resulting in a change in the basic function of the subject matter at issue.

While particular embodiments have been illustrated and described in this disclosure, it should be understood that various other changes and modifications may be made without departing from the scope of the claimed subject matter. Moreover, although various aspects of the claimed subject matter have been described in this disclosure, such aspects need not be utilized in combination. It is therefore intended that the appended claims cover all such changes and modifications that are within the scope of the claimed subject matter.

What is claimed is:

1. A coated particle comprising:
   a particulate substrate;
   a surface copolymer layer surrounding the particulate substrate, the surface copolymer layer comprising a copolymer of at least two monomers chosen from styrene, methyl methacrylate, ethylene, propylene, butylene, imides, urethanes, sulfones, carbonates, and acrylamides;
   a resin layer surrounding the surface copolymer layer, the resin layer comprising a cured resin; and
   at least one nanoparticulate additive within the surface copolymer layer, the resin layer, or both.

2. The coated particle of claim 1, in which the particulate substrate is chosen from oxide particles, silicate particles, sands, ceramic particles, resin particles, plastic particles, mineral particles, glass particles, silica particles, alumina particles, fumed carbon particles, carbon black, graphite, mica, titania, zirconia, boron, fly ash, or combinations thereof.

3. The coated particle of claim 1, in which the particulate substrate is a sand.

4. The coated particle of claim 1, in which the surface copolymer layer comprises a copolymer of styrene and methyl methacrylate.

5. The coated particle of claim 1, in which the cured resin is an epoxy resin and is chosen from bisphenol A epoxy resins, bisphenol F epoxy resins, Novolac epoxy resins, aliphatic epoxy resins, and glycidylamine epoxy resins.

6. The coated particle of claim 1, in which the surface copolymer layer is a composite of the copolymer and at least one nanoparticulate additive distributed within the polymeric material.

7. The coated particle of claim 6, in which the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

8. The coated particle of claim 6, in which the composite of the copolymer and at least one nanoparticulate additive comprises from 0.1% to 10% by weight nanoparticulate additive, based on the total weight of the composite.

9. The coated particle of claim 1, in which the resin layer is a composite of the cured resin and at least one nanoparticulate additive distributed within the cured resin.

10. The coated particle of claim 9, in which the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

11. The coated particle of claim 9, in which the composite of the cured resin and at least one nanoparticulate additive comprises from 0.01% to 10% by weight nanoparticulate additive, based on the total weight of the composite.

12. The coated particle of claim 1, in which the surface copolymer layer is a composite of the copolymer and at least one nanoparticulate additive distributed within the copolymer; and the resin layer is a composite of the cured resin and at least one nanoparticulate additive distributed within the cured resin.

13. The coated particle of claim 12, in which the nanoparticulate additives in the surface copolymer layer and in the resin layer are independently chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these.

14. The coated particle of claim 1, in which:
the particulate substrate is sand;
the surface copolymer layer comprises a copolymer of polystyrene and poly(methyl methacrylate);
the resin layer comprises an epoxy resin and is chosen from bisphenol A epoxy resins, bisphenol F epoxy resins, Novolac epoxy resins, aliphatic epoxy resins, and glycidylamine epoxy resins; and
the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

15. The coated particle of claim 1, in which:
the particulate substrate is sand;
the surface copolymer layer comprises a copolymer of polystyrene and poly(methyl methacrylate);
the surface copolymer layer is a composite of the copolymer and at least one nanoparticulate additive distributed within the copolymer;
the resin layer comprises an epoxy resin chosen from bisphenol A epoxy resins, bisphenol F epoxy resins, Novolac epoxy resins, aliphatic epoxy resins, and glycidylamine epoxy resins; and
the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

16. The coated particle of claim 1, in which:
the particulate substrate is sand;
the surface copolymer layer comprises a copolymer of polystyrene and poly(methyl methacrylate);
the surface copolymer layer is a composite of the copolymer and at least one nanoparticulate additive distributed within the copolymer;
the resin layer comprises an epoxy resin is chosen from bisphenol A epoxy resins, bisphenol F epoxy resins, Novolac epoxy resins, aliphatic epoxy resins, and glycidylamine epoxy resins;
the resin layer is a composite of the cured resin and at least one nanoparticulate additive distributed within the epoxy resin; and
the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

17. The coated particle of claim 1, in which:
the particulate substrate is sand;
the surface copolymer layer comprises a copolymer of polystyrene and poly(methyl methacrylate);
the surface copolymer layer is a composite of the polymeric material and at least one nanoparticulate additive distributed within the polymeric material;
the resin layer comprises an epoxy resin chosen from bisphenol A epoxy resins, bisphenol F epoxy resins, Novolac epoxy resins, aliphatic epoxy resins, and glycidylamine epoxy resins;
the resin layer is a composite of the cured resin and at least one nanoparticulate additive distributed within the epoxy resin; and
the nanoparticulate additive is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

18. A method of preparing a coated particle, the method comprising:

preparing a first mixture comprising at least one polymerizable material, an initiator, and optionally a solvent;

contacting the first mixture to a particulate substrate to form a polymerization mixture;

heating the polymerization mixture to cure the polymerizable material and form a polymer-coated particulate comprising the particulate substrate and a surface copolymer layer surrounding the particulate substrate;

preparing a second mixture comprising the polymer-coated substrate, an uncured resin, and a solvent; and adding a curing agent to the second mixture to cure the uncured resin and form the coated particle, the coated particle comprising the particulate substrate, the surface copolymer layer surrounding the particulate substrate, and a resin layer surrounding the surface copolymer layer, the resin layer comprising a cured resin, in which the first mixture, the second mixture, or both the first mixture and the second mixture, further comprises at least one nanoparticulate additive.

19. The method of claim 18, in which:

the at least one polymerizable material comprises at least two monomers chosen from styrene, methyl methacrylate, ethylene, propylene, butylene, imides, urethanes, sulfones, carbonates, and acrylamides the cured resin is chosen from bisphenol A epoxy resins, bisphenol F epoxy resins, Novolac epoxy resins, aliphatic epoxy resins, and glycidylamine epoxy resins.

20. The method of claim 18, in which the particulate substrate is a sand.

21. The method of claim 18, in which the at least one nanoparticulate additive in the first mixture, the second mixture, or both the first mixture and the second mixture, is chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles.

22. The method of claim 18, in which the at least one nanoparticulate additive in the first mixture, the second mixture, or both the first mixture and the second mixture, is chosen from graphene nanoparticles, graphene oxide nanoparticles, carbon nanotubes, and hexagonal boron nitride nanoparticles.

23. A hydraulic fracturing composition comprising:

a fluid medium; and coated particles according to claim 1 dispersed within the fluid medium.

24. A method of treating a subterranean formation, the method comprising:

contacting a subterranean formation with a hydraulic fracturing composition according to claim 23; and propagating at least one subterranean fracture in the subterranean formation with the hydraulic fracturing fluid.

* * * * *